(12) United States Patent
Tsuruta et al.

(10) Patent No.: US 7,187,145 B2
(45) Date of Patent: Mar. 6, 2007

(54) MOTOR CONTROLLER

(75) Inventors: Kazuhiro Tsuruta, Fukuoka (JP); Thalmann Guillaume, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/569,977

(22) PCT Filed: Aug. 20, 2004

(86) PCT No.: PCT/JP2004/011986

§ 371 (c)(1), (2), (4) Date: Feb. 28, 2006

(87) PCT Pub. No.: WO2005/025045

PCT Pub. Date: Mar. 19, 2005

(65) Prior Publication Data

US 2007/0007920 A1   Jan. 11, 2007

(30) Foreign Application Priority Data

Sep. 4, 2003   (JP) .............................. 2003-312692

(51) Int. Cl.
*H02P 5/00*   (2006.01)

(52) U.S. Cl. ...................................... 318/268; 318/433

(58) Field of Classification Search ................ 318/268, 318/430–434
See application file for complete search history.

(56) References Cited

U.S. PATENT DOCUMENTS

| 5,994,864 | A | * | 11/1999 | Inoue et al. ............. 318/568.2 |
| 5,998,957 | A | * | 12/1999 | Tadmor et al. ............. 318/701 |
| 6,157,156 | A | * | 12/2000 | Tsuruta ....................... 318/609 |
| 6,992,454 | B2 | * | 1/2006 | Tsuruta ....................... 318/561 |
| 7,030,581 | B1 | * | 4/2006 | Ikeda ......................... 318/432 |

FOREIGN PATENT DOCUMENTS

| JP | 3185857 B2 | 5/2001 |
| JP | 2001-169581 A | 6/2001 |
| JP | 2001-238477 A | 8/2001 |

* cited by examiner

*Primary Examiner*—Bentsu Ro
(74) *Attorney, Agent, or Firm*—Sughrue Mion, PLLC (57) ABSTRACT

Control parameters can be easily and precisely adjusted, the response of a motor controller can be highly accurately made at high speed and a vibration can be suppressed to a low level.

Even when an inertia is varied during an operation or a viscous friction is high, the inertia or a viscous friction coefficient can be identified by a control parameter adjusting unit (18) for performing a calculation on the basis of a torque command $T_{ref}$ and the speed $V_{fb}$ of a motor. As a result, control parameters can be easily and precisely adjusted and the response of a motor controller can be highly accurately carried out at high speed and a vibration can be suppressed to a low level.

7 Claims, 6 Drawing Sheets

MOTOR CONTROLLER

TECHNICAL FIELD

The present invention relates to a technique for identifying an inertia and a viscous friction coefficient when the inertia is varied during an operation in a motor controller for driving a robot or a machine tool.

BACKGROUND ART

Some of devices for controlling a motor of a usual motor controller have a function for identifying an inertia (for instance, see Patent Document 1).

A device proposed by the applicant of the present application is provided with a speed control unit for determining a torque command and controlling a speed of a motor so that an inputted speed command corresponds to the actual speed of the motor, an estimating unit for simulating the speed control unit so that the speed of a model corresponds to the speed of the motor and an identifying unit for identifying an inertia from a ratio of a value obtained by time integrating in a prescribed section the absolute value of a value obtained by passing a speed tracking error of the speed control unit through a prescribed filter to a value obtained by time integrating the absolute value of a speed tracking error of the estimating unit in the same section, and only when the speed tracking error of the estimating unit is zero or speed in the estimating unit is not zero, a calculation for identifying the inertia is carried out in the identifying unit.

In this device, since an identifying operation can be performed in real time for an arbitrary speed command, even when the inertia changes with respect to time, the inertia can be identified.

Patent Document 1: JP-B2-3185857 (page 3, FIG. 1)

DISCLOSURE OF THE INVENTION

Problems that the Invention is to Solve

However, in the related art, when a viscous friction is high, the identified value of the inertia may be calculated as a slightly larger value owing to its influence. Accordingly, when control parameters are adjusted by using the identified inertia value, a vibration is undesirably generated. Thus, it is an object of the present invention to provide a motor controller in which control parameters can be easily and precisely adjusted by decreasing an inertia identification error even when a viscous friction is high and identifying a viscous friction coefficient, the response of the motor controller can be made precise and fast, and a vibration can be suppressed to a low level.

MEANS FOR SOLVING THE PROBLEMS

In order to solve the above-described problems, the present invention is constructed as described below.

In the invention according to claim 1, a motor controller is provided with: a speed command generating unit for outputting a speed command $V_{ref}$; a speed control unit for inputting the speed command $V_{ref}$ and a motor speed detecting signal $V_{fb}$ to output a torque command $T_{ref}$ so that the motor speed detecting signal $V_{fb}$ corresponds to the speed command $V_{ref}$; a torque control unit for inputting the torque command $T_{ref}$ to control a torque and output a motor driving current to a motor; a detector for detecting the position or the speed of the motor to output the motor speed detecting signal $V_{fb}$; and a control parameter adjusting unit for calculating the inertia total value J obtained by adding up a value of the rotor inertia of the motor and a value of the inertia of a load machine driven by the motor that are converted to the rotation axis of the motor and a viscous friction coefficient D at least on the basis of the torque command $T_{ref}$ and the motor speed detecting signal $V_{fb}$.

Further, in the invention according to claim 2, assuming that a value obtained by integrating the torque command $T_{ref}$ in an interval [a, b], that is, from time a to time b in the control parameter adjusting unit is $ST_{ref}$, namely, $$ST_{ref} = \int_a^b T_{ref} dt \qquad (1),$$

the inertia total value J obtained by adding up the value of the rotor inertia of the motor and the value of the inertia of the load machine driven by the motor that are converted to the rotation axis of the motor and the viscous friction coefficient D are calculated in accordance with $$J = \frac{\int_a^b ST_{ref} V_{fb} dt}{\int_a^b V_{fb}^2 dt}, \text{ and} \qquad (2)$$

$$D = \frac{\int_a^b T_{ref} V_{fb} dt}{\int_a^b V_{fb}^2 dt}. \qquad (3)$$

Further, in the invention according to claim 3, the interval [a, b] for calculating the inertia total value J in the control parameter adjusting unit is set to an interval in which the position $P_{fb}(a)$ of the motor at the time a corresponds to the position $P_{fb}(b)$ of the motor at the time b.

Further, in the invention according to claim 4, when the viscous friction coefficient D is already known, the inertia total value J is calculated in the control parameter adjusting unit in accordance with $$J = \frac{\int_a^b ST_{ref} V_{fb} dt}{\int_a^b V_{fb}^2 dt} - \frac{D}{2} \cdot \frac{(P_{fb}(b)^2 - P_{fb}(a)^2)}{\int_a^b V_{fb}^2 dt}. \qquad (4)$$

Further, in the invention according to claim 5, when the inertia total value J is already known, assuming that $V_{fb}(a)$ is the speed of the motor at the time a, and $V_{fb}(b)$ is the speed of the motor at the time b, the viscous friction coefficient D is calculated in the control parameter adjusting unit in accordance with $$D = \frac{\int_a^b T_{ref} V_{fb} dt}{\int_a^b V_{fb}^2 dt} - \frac{J}{2} \cdot \frac{(V_{fb}(b)^2 - V_{fb}(a)^2)}{\int_a^b V_{fb}^2 dt}. \qquad (5)$$

Further, in the invention according to claim 6, only when the speed command $V_{ref}$ is not 0 and not constant, the inertia total value J is calculated in the control identifying unit in accordance with the above-described formula (2)

$$J = \frac{\int_a^b ST_{ref} V_{fb} \, dt}{\int_a^b V_{fb}^2 \, dt} \quad (2)$$

or the above-described formula (4)

$$J = \frac{\int_a^b ST_{ref} V_{fb} \, dt}{\int_a^b V_{fb}^2 \, dt} - \frac{D}{2} \cdot \frac{(P_{fb}(b)^2 - P_{fb}(a)^2)}{\int_a^b V_{fb}^2 \, dt}. \quad (4)$$

Still further, in the invention according to claim 7, the identified inertia total value J and the identified viscous friction coefficient D are used for adjusting control parameters, generating a feed forward signal or adjusting a vibration suppressing compensator.

ADVANTAGE OF THE INVENTION

According to the present invention, even when an inertia is varied during an operation or when a viscous friction is high, the inertia can be precisely identified and a viscous friction coefficient can be identified. Further, according to claim 7, the control parameters can be effectively easily and precisely adjusted and the response of the motor controller can be made precise and fast, and a vibration can be suppressed to a low level.

DESCRIPTION OF REFERENCE NUMERALS AND SIGNS

11 . . . position control unit
12 . . . speed control unit
13 . . . torque control unit
14 . . . motor
15 . . . detector
16 . . . difference device
17 . . . rigid body load
18 . . . control parameter adjusting unit
61 . . . feed forward signal controller

BEST MODE FOR CARRYING OUT THE INVENTION

Now, embodiments of the present invention will be described below by referring to the drawings.

First Embodiment

In an actual motor controller, various functions or means are incorporated, however, only functions or means related to the present invention are described and explained in the drawings. The same names will be designated by the same reference numerals hereinafter and a duplicated explanation will be omitted as much as possible.

Figure 1:
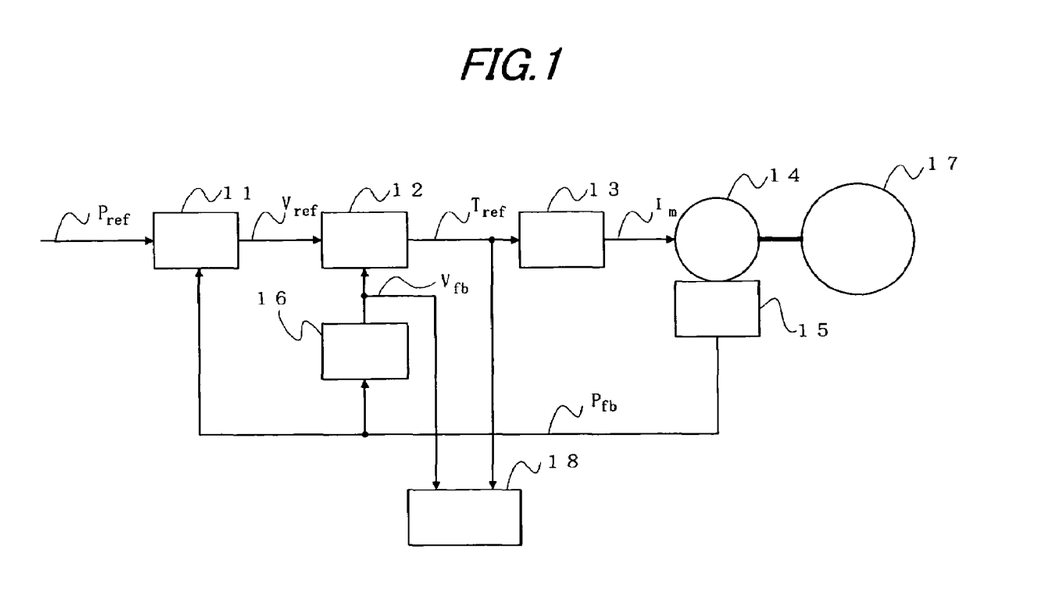
[FIG. 1] is a block diagram of a motor controller for explaining a first embodiment to which the present invention is applied.

FIG. 1 is a block diagram when the present invention is applied to a driving device having a motor provided with a rigid body load. In FIG. 1, reference numeral 11 designates a position control unit, 12 designates a speed control unit, 13 designates a torque control unit, 14 designates a motor, 15 designates a detector, 16 designates a difference device, 17 designates a rigid body load and 18 designates a control parameter adjusting unit.

The position control unit 11 inputs a position command $P_{ref}$ and a position signal $P_{fb}$ of the motor 14 to output a speed command $V_{ref}$ to the speed control unit 12. The speed control unit 12 inputs the speed command $v_{ref}$ and a speed signal $V_{fb}$ of the motor to output a torque command $T_{ref}$ to the torque control unit 13 and the control parameter adjusting unit 18. The torque control unit 13 inputs the torque command $T_{ref}$ to output a motor driving current $I_m$ to the motor 14. The motor 14 is driven by the motor driving current $I_m$ to generate a torque. The rigid body load 17 is driven by the torque. The detector 15 is attached to the motor 14 to output the position signal $P_{fb}$ to the position control unit 11 and the difference device 16. The difference device 16 inputs the position signal $P_{fb}$ to output the speed signal $V_{fb}$ to the speed control unit 12 and the control parameter adjusting unit 18. The control parameter adjusting unit 18 inputs the speed signal $V_{fb}$ and the torque command $T_{ref}$.

The position control unit 11 carries out a position control calculation so that the position signal $P_{fb}$ corresponds the position command $P_{ref}$. The speed control unit 12 carries out a speed control calculation so that the speed signal $V_{fb}$ corresponds to the speed command $V_{ref}$. The torque control unit 13 carries out a torque control calculation so that the torque generated by the motor 14 corresponds to the torque command $T_{ref}$. The detector 15 detects the position of the motor 14. The difference device 16 takes a difference for each prescribed time of the position signal $P_{fb}$ to obtain the speed signal $V_{fb}$. The control parameter adjusting unit 18 calculates the total value J of the inertia of a rotor of the motor 14 and the inertia of the rigid body load 17 attached to the motor 14 and a viscous friction coefficient from the speed signal $V_{fb}$ and the torque command $T_{ref}$.

In the description, the output of the speed control unit is considered to be the torque command by assuming a rotary type motor. In the case of a linear motor, the output of the speed control unit may be considered to be a thrust command with the same structure. Accordingly, when the present invention is employed, the total value of the inertia and the viscous friction coefficient can be identified in a real time by a simple calculation.

The feature of the present invention is resides in that the control parameter adjusting unit 18 is provided for calculating the inertia J and the viscous friction coefficient D on the basis of the torque command $T_{ref}$ and the motor speed $V_{fb}$ of the motor.

Now, a specific calculation method will be described below.

Assuming that an object to be controlled is represented by the inertia J and the viscous friction coefficient D, the relation between the torque command $T_{ref}$ and the speed $V_{fb}$ of the motor is expressed by a formula (6).

$$T_{ref}=JV'_{fb}+DV_{fb} \tag{6}$$

In this case, $V'_{fb}$ designates a time differentiated value of $V_{fb}$.

When both the sides of the formula (6) are time integrated in an interval [a, b], a formula (7) is obtained. Further, when the formula (1) is allowed to be placed, and both the sides thereof are multiplied by the speed $V_{fb}$, a formula (8) is obtained.

$$\int_a^b T_{ref} dt = JV_{fb}+DP_{fb} \tag{7}$$

$$ST_{ref}=\int_a^b T_{ref} dt \tag{1}$$

$$ST_{ref}V_{fb}=JV_{fb}^2+DP_{fb}V_{fb} \tag{8}$$

Further, when the formula (8) is time integrated in the interval [a, b], a formula (9) is obtained. Here, the second term of the right side of the formula (9) is a formula (10), so that the formula (4) is obtained from the formula (9) and the formula (10).

$$\int_a^b ST_{ref}V_{fb} dt = J\int_a^b V_{fb}^2 dt + D\int_a^b P_{fb}V_{fb} dt \tag{9}$$

$$D\int_a^b P_{fb}V_{fb} dt = D\int_a^b P_{fb}P_{fb}' dt \tag{10}$$
$$= \frac{D}{2}(P_{fb}(b)^2 - P_{fb}(a)^2)$$

$$J = \frac{\int_a^b ST_{ref}V_{fb} dt}{\int_a^b V_{fb}^2 dt} - \frac{D}{2} \cdot \frac{(P_{fb}(b)^2 - P_{fb}(a)^2)}{\int_a^b V_{fb}^2 dt}. \tag{4}$$

Since the denominator of the second term of the right side of the formula (4) is always positive, the denominator increases with respect to time. Accordingly, when the interval [a, b] is set to a wide range, the formula (2) is obtained from the formula (4).

$$J = \frac{\int_a^b ST_{ref}V_{fb} dt}{\int_a^b V_{fb}^2 dt} \tag{2}$$

Further, in the formula (4), when the interval [a, b] is set to an interval in which the position $P_{fb}(a)$ of the motor at time a corresponds to the position $P_{fb}(b)$ of the motor at time b, the numerator of the second term of the right side becomes zero. Therefore, even when the interval [a, b] is not set to a wide range, the above-described formula (2) is valid.

Now, a method for calculating the viscous friction coefficient D will be described below. The relation of the formula (6) is employed as in the method for calculating the inertia, and when both the sides are multiplied by the speed $V_{fb}$, a formula (11) is obtained. When both the sides of the formula (11) are integrated in the interval [a, b], a formula (12) is obtained. Here, since the first term of the right side of the formula (12) is a formula (13), the formula (5) is obtained by the formula (12) and the formula (13).

$$T_{ref}V_{fb}=JV'_{fb}V_{fb}+DV_{fb}^2 \tag{11}$$

$$\int_a^b T_{ref}V_{fb} dt = J\int_a^b V'_{fb}V_{fb} dt + D\int_a^b V_{fb}^2 dt \tag{12}$$

$$\int_a^b V'_{fb}V_{fb} dt = \frac{1}{2}(V_{fb}(b)^2 + V_{fb}(a)^2) \tag{13}$$

$$D = \frac{\int_a^b T_{ref}V_{fb} dt}{\int_a^b V_{fb}^2 dt} - \frac{J}{2} \cdot \frac{(V_{fb}(b)^2 - V_{fb}(a)^2)}{\int_a^b V_{fb}^2 dt}. \tag{5}$$

Since the denominator of the second term of the right side of the formula (5) is always positive, the denominator increases together with time. Accordingly, when the interval [a, b] is set to a wide range, the formula (3) is obtained from the formula (5).

$$D = \frac{\int_a^b T_{ref}V_{fb} dt}{\int_a^b V_{fb}^2 dt} \tag{3}$$

In addition, in the formula (5), when the interval [a, b] is set to an interval in which the speed $V_{fb}(a)$ of the motor at the time a corresponds to the speed $V_{fb}(b)$ of the motor at the time b, the numerator of the second term of the right side of the formula (5) becomes zero. Therefore, even when the interval [a, b] is not set to a large value, the above-described formula (3) is established.

The methods for calculating the inertia J and the viscous friction coefficient D are described above.

Now, experimental results obtained when the rigid body load twice as high as the inertia of the rotor of the motor is attached to the motor will be described by referring to the drawings.

FIGS. 2 to 5 show the experimental results when the rigid body load 17 having an inertia twice as high as the inertia Jm of the motor is attached to the motor 14.

Figure 2:
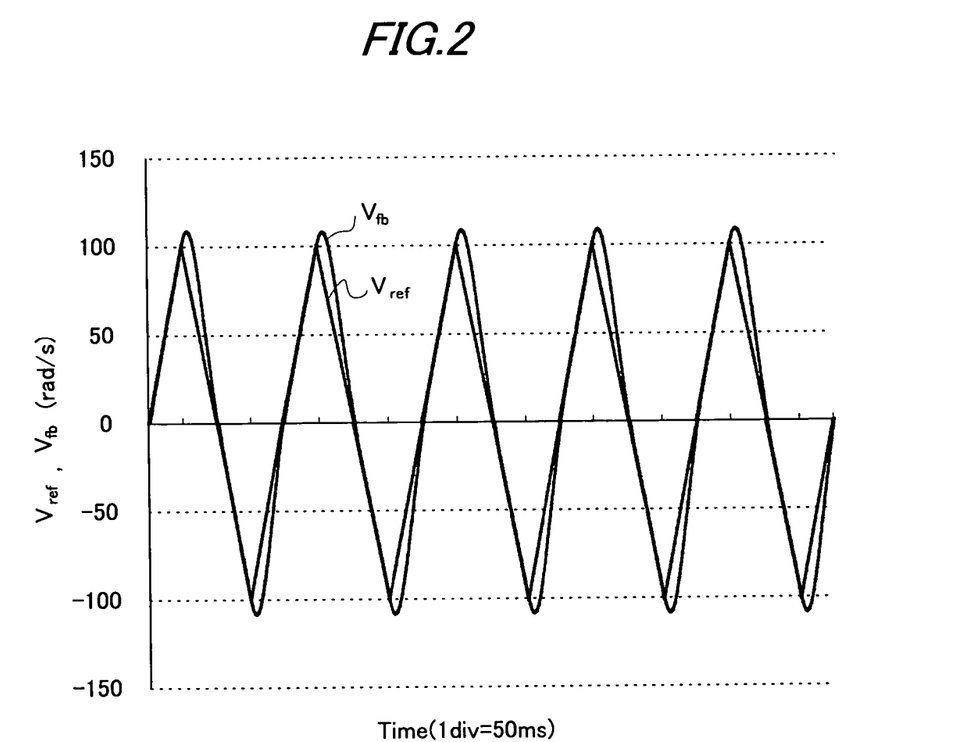
[FIG. 2] shows the experimental results (a speed command $V_{ref}$ and a speed signal $V_{fb}$) of the first embodiment.
Figure 3:
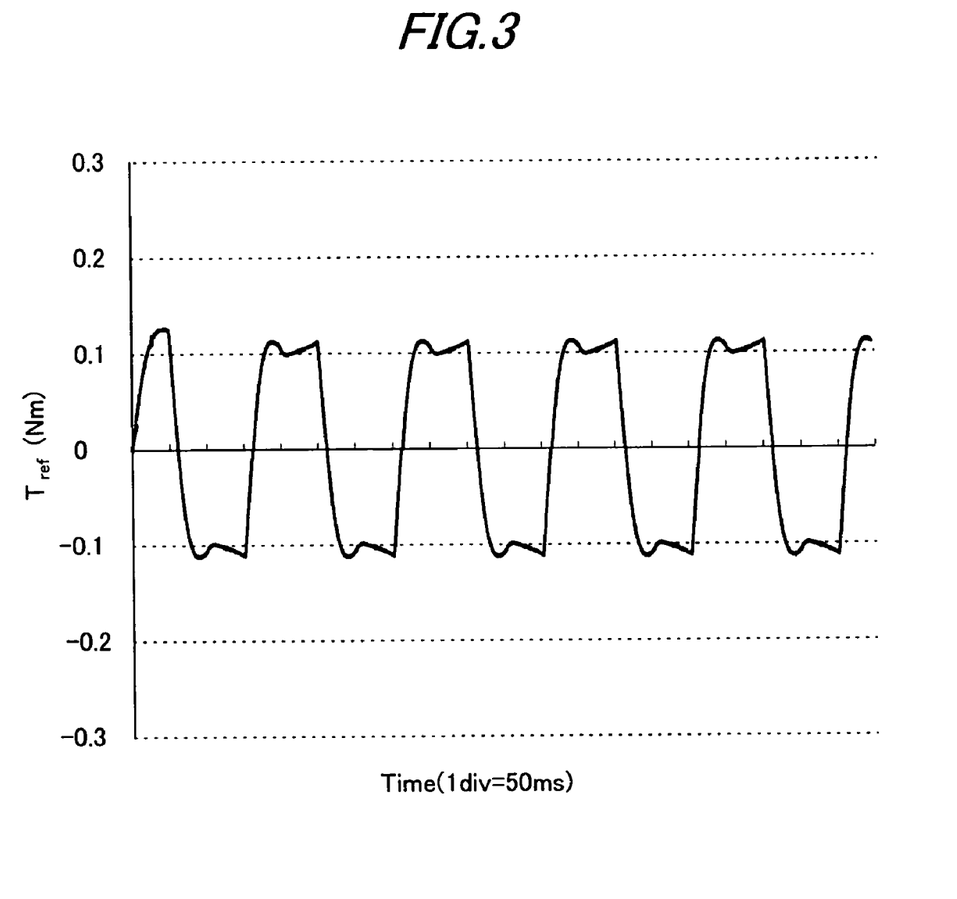
[FIG. 3] shows the experimental results (a torque command $T_{ref}$) of the first embodiment.

FIG. 2 shows a speed command $V_{ref}$ (rad/s) and a speed signal $V_{fb}$ (rad/s) and FIG. 3 shows a torque command $T_{ref}$(Nm).

Figure 4:
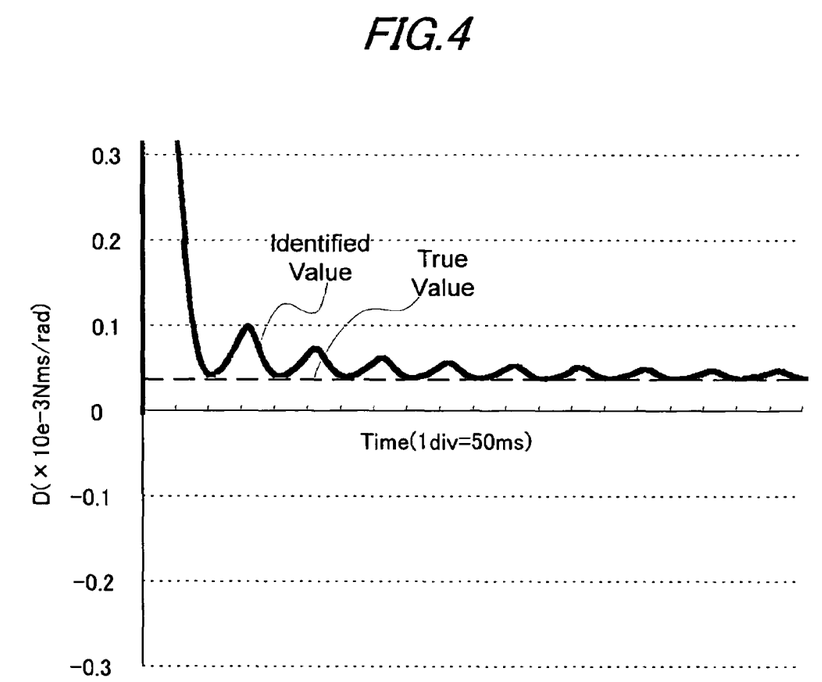
[FIG. 4] shows the experimental results (an identified viscous friction coefficient and a true value) of the first embodiment.

Further, FIG. 4 shows an identified viscous friction coefficient D (×10e−3 Nms/rad) and a line shown by a broken line designates a true value (a calculated value=0.04×10e−3 Nms/rad) of the viscous friction coefficient.

Figure 5:
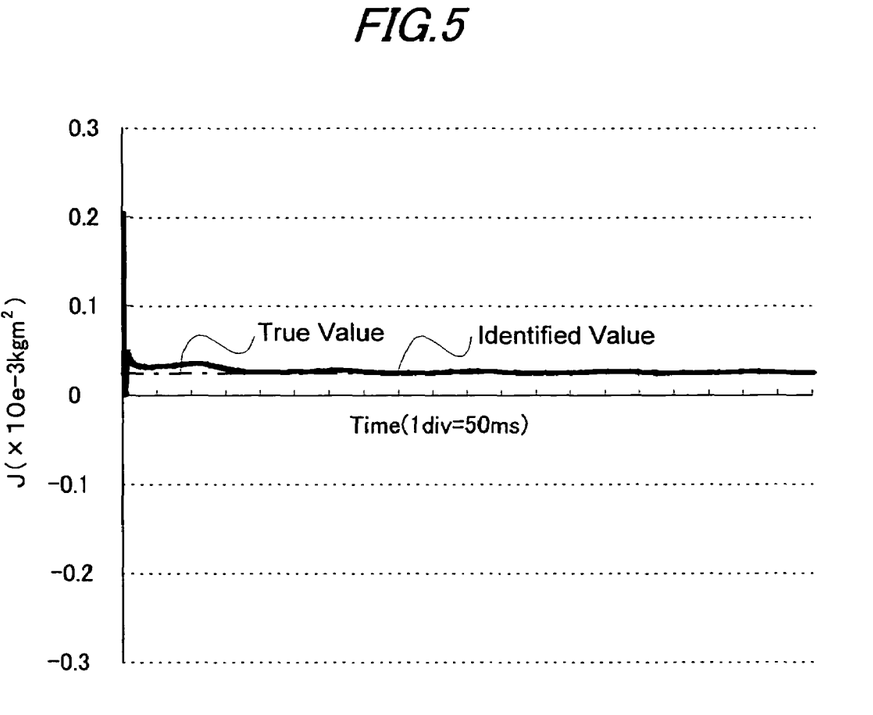
[FIG. 5] shows the experimental results (an identified inertia total value J and a true value) of the first embodiment.

Further, FIG. 5 shows the identified inertial total value J (×10e−3 kgm$^2$). A line shown by a dashed line designates a true value (a calculated value=0.025×10e−3 kgm$^2$) of the inertia total value.

As apparent from FIGS. 4 and 5, the viscous friction coefficient identified by the present method substantially agrees to the true value. Further, the identified inertia total value substantially corresponds to the true value. As obviously understood from the above-described results, the present invention is effective.

Second Embodiment

Figure 6:
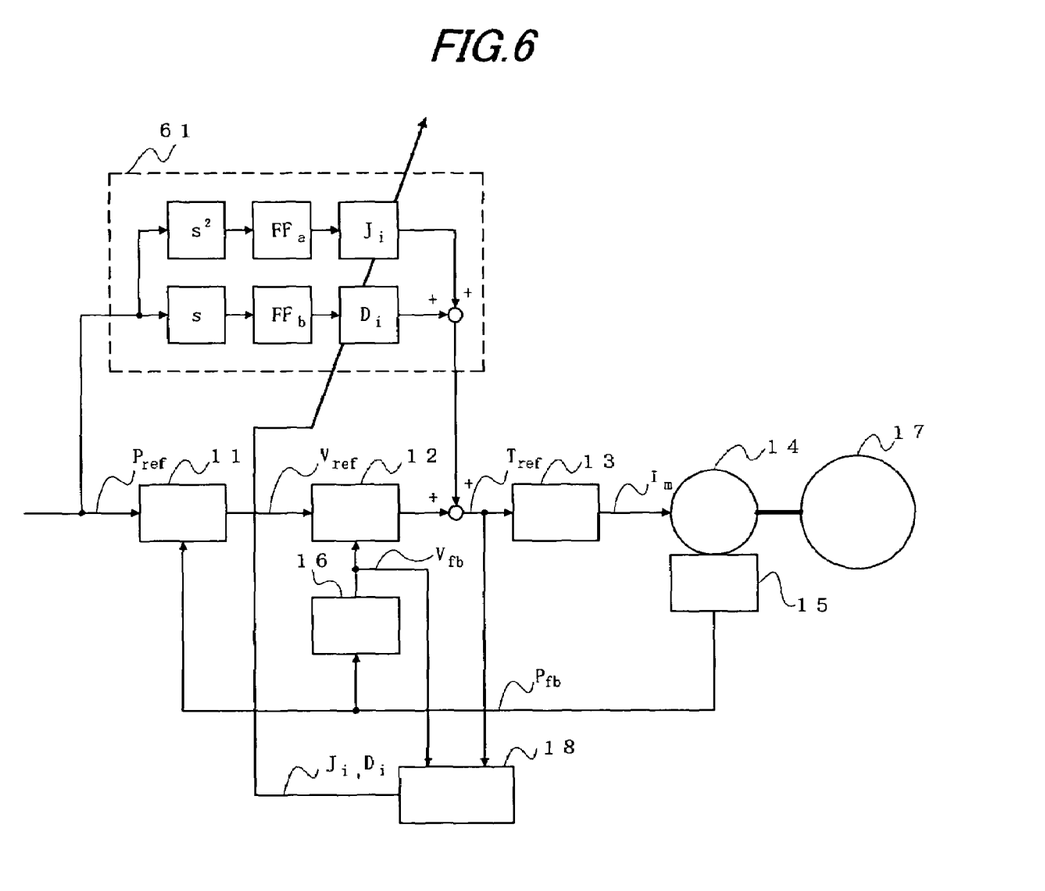
[FIG. 6] is a block diagram of a motor controller for explaining a second embodiment to which the present invention is applied.

FIG. 6 is a block diagram of a motor controller for explaining an example in which the inertia total value and a viscous friction coefficient identified by the present invention are used for generating a feed forward signal.

In FIG. 6, reference numeral 61 designates a feed forward signal controller. The feed forward signal controller 61 inputs a position command $P_{ref}$ and an input of a position control unit 11 at the same time to generate and output a feed forward signal ff. The sum of an output signal of a speed control unit 12 and the feed forward signal ff forms a torque command $T_{ref}$.

In the feed forward signal controller 61, s designates a Laplace veriable and $FF_a$ and $FF_b$ designate feed forward control gains. Ji and Di respectively designate the inertia total value J and a viscous friction coefficient D identified by a control parameter adjusting unit 18.

For instance, the feed forward signal ff may be obtained in such a way that the position command $P_{ref}$ differentiated twice with respect to time is multiplied by the feed forward control gain $FF_a$ and further multiplied by the identified inertia total value $J_i$, and a thus obtained value is added to a value obtained by differentiating the position command $P_{ref}$ by once, multiplying a thus got value by the feed forward control gain $FF_b$ and further multiplying a thus got value by the identified viscous friction coefficient $D_i$.

In such a way, the present invention can be used for generating the feed forward signal.

Further, since the inertia total value J and the viscous friction coefficient D identified by the present invention are accurate, it is to be understood that control parameters such as a position loop gain or a speed loop gain can be adjusted on the basis of these values.

As an example that the inertia total value J and the viscous friction coefficient D identified by the present invention can be used for adjusting a vibration suppressing compensator such as a disturbance observer, for instance, JP-B2-3360935 as a patent of the applicant of the present invention is known.

In this patent, the inertia total value J and the viscous friction coefficient D identified by the present invention are employed so that an estimated disturbance signal can be accurately calculated and a vibration can be more easily suppressed.

INDUSTRIAL APPLICABILITY

The present invention can be used as a motor controller for driving a machine tool or an industrial robot.

The invention claimed is:

1. A motor controller comprising:
   a speed command generating unit that outputs a speed command $V_{ref}$;
   a speed control unit, to which the speed command $V_{ref}$ and a motor speed detecting signal $V_{fb}$ are inputted, that outputs a torque command $T_{ref}$ so that the motor speed detecting signal $V_{fb}$ corresponds to the speed command $V_{ref}$;
   a torque control unit, to which the torque command $T_{ref}$ is inputted, that controls a torque and outputs a motor driving current to a motor;
   a detector that detects a position or a speed of the motor and outputs the motor speed detecting signal $V_{fb}$; and
   a control parameter adjusting unit that calculates an inertia total value J and a viscous friction coefficient D at least based on the torque command $T_{ref}$ and the motor speed detecting signal $V_{fb}$, wherein the inertia total value J is a total value obtained by adding up a value of a rotor inertia of the motor and a value of an inertia of a load machine driven by the motor that are converted to a rotation axis of the motor.

2. The motor controller according to claim 1, wherein, assuming that a value obtained by integrating the torque command $T_{ref}$ over an interval [a, b], that is, from time a to time b in the control parameter adjusting unit is $ST_{ref}$, namely, $$ST_{ref} = \int_a^b T_{ref} dt \quad (1),$$

the inertia total value J obtained by adding up the value of the rotor inertia of the motor and the value of the inertia of the load machine driven by the motor that are converted to the rotation axis of the rotor, and the viscous friction coefficient D are calculated in accordance with $$J = \frac{\int_a^b ST_{ref} V_{fb} dt}{\int_a^b V_{fb}^2 dt}, \quad (2)$$

$$D = \frac{\int_a^b T_{ref} V_{fb} dt}{\int_a^b V_{fb}^2 dt}. \quad (3)$$

3. The motor controller according to claim 1, wherein the interval [a, b] for calculating the inertia total value J in the control parameter adjusting unit is set to an interval in which the position $P_{fb}(a)$ of the motor at the time a corresponds to the position $P_{fb}(b)$ of the motor at the time b.

4. The motor controller according to claim 1, when the viscous friction coefficient D is already known, the inertia total value J is calculated in the control parameter adjusting unit in accordance with $$J = \frac{\int_a^b ST_{ref} V_{fb} dt}{\int_a^b V_{fb}^2 dt} - \frac{D}{2} \cdot \frac{(P_{fb}(b)^2 - P_{fb}(a)^2)}{\int_a^b V_{fb}^2 dt}. \quad (4)$$

5. The motor controller according to claim 1, when the inertia total value J is already known, assuming that $V_{fb}(a)$ is the speed of the motor at the time a, and $V_{fb}(b)$ is the speed of the motor at the time b, the viscous friction coefficient D is calculated in the control parameter adjusting unit in accordance with $$D = \frac{\int_a^b T_{ref} V_{fb} dt}{\int_a^b V_{fb}^2 dt} - \frac{J}{2} \cdot \frac{(V_{fb}(b)^2 - V_{fb}(a)^2)}{\int_a^b V_{fb}^2 dt}. \quad (5)$$

6. The motor controller according to claim 1, only when the speed command $V_{ref}$ is not 0 and not constant, the inertia total value J is calculated in the control identifying unit in accordance with the above-described formula (2)

$$J = \frac{\int_a^b ST_{ref} V_{fb} \, dt}{\int_a^b V_{fb}^2 \, dt} \qquad (2)$$

or the above-described formula (4)

$$J = \frac{\int_a^b ST_{ref} V_{fb} \, dt}{\int_a^b V_{fb}^2 \, dt} - \frac{D}{2} \cdot \frac{(P_{fb}(b)^2 - P_{fb}(a)^2)}{\int_a^b V_{fb}^2 \, dt}. \qquad (4)$$

7. The motor controller according to claim 1, wherein the identified inertia total value J and the identified viscous friction coefficient D are used for adjusting control parameters, generating a feed forward signal or adjusting a vibration suppressing compensator.

* * * * *